Nov. 21, 1939.  E. L. RASMUSSEN  2,180,429
WEEDER
Filed Sept. 10, 1938
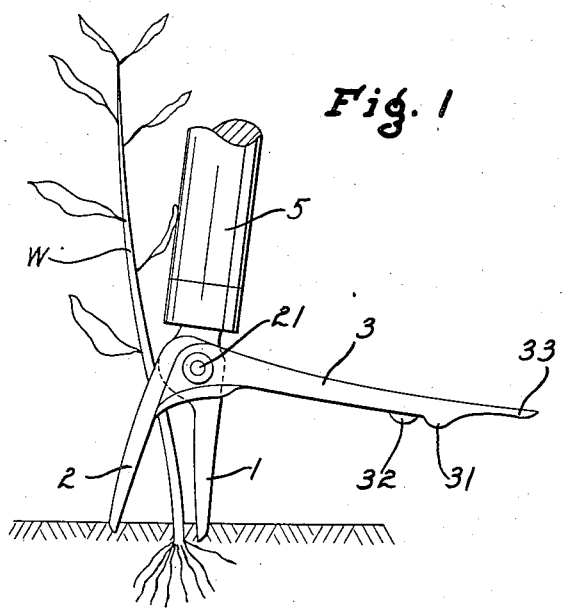
Fig. 1
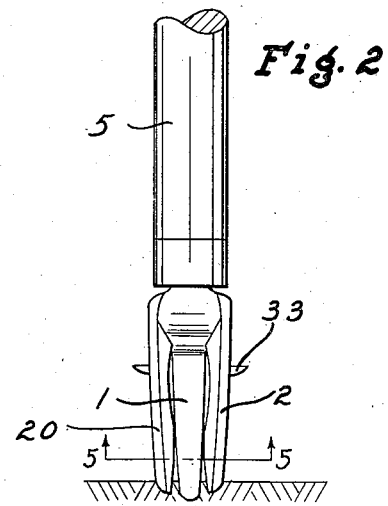
Fig. 2
Fig. 4
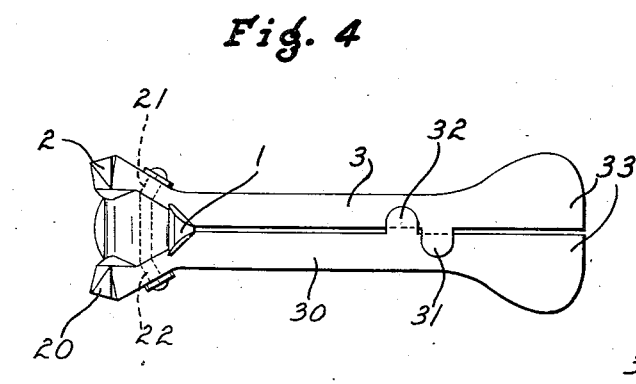
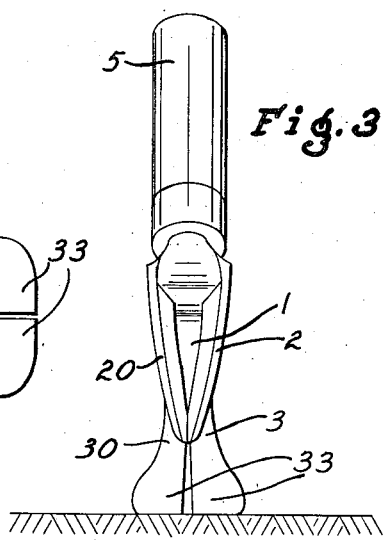
Fig. 3
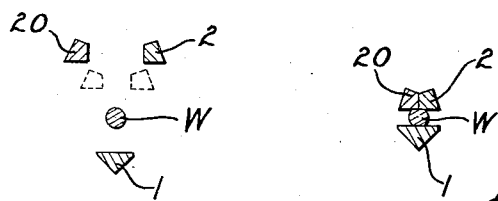
Fig. 5  Fig. 6
Inventor
Edward L. Rasmussen
By Charles L. Reynolds
Attorney Patented Nov. 21, 1939

2,180,429

UNITED STATES PATENT OFFICE 2,180,429

WEEDER

Edward L. Rasmussen, near Seattle, Wash.

Application September 10, 1938, Serial No. 229,297

9 Claims. (Cl. 254—132)

My invention relates to hand tools for pulling weeds from lawns. These weeds are of various types, some having long single or plural taproots that taper downwardly from the ground level, as the dandelion, and others having a mass or bunch of roots which lie close to the surface, as the plantain. In either such type it is essential that the root be removed or the weed will live and flourish. If a lawn is to be rid of weeds, therefore, it is necessary to remove not only the top, but also the root, and a successful weeder must be of a type to engage and pull out the root, whether the weed be of one type or of the other.

But a proper lawn weeder must do more than remove the root—it must remove it with the minimum of removal of grass, and with a minimum of disfigurement of the lawn. Weeders have been employed heretofore which would remove the root, but they would also enclose and remove a considerable surrounding area of grass, leaving large and unsightly holes in the lawn, and while these holes might eventually grow over and fill in with grass, they would be unsightly until this occurred, and would, moreover, offer fertile soil for the reception of additional weed seed.

It is an object of this invention, therefore, to provide a lawn weeder which will engage and remove the weeds and their roots, of whatever type, but which in addition will cause the minimum disfigurement to the lawn, and the minimum of disturbance to the grass, and which will leave, practically speaking, no hole except that which has been caused by the removal of the weed itself, and by the action of the growing weed in crowding out the grass.

It is usually desirable to be able to operate such a weeder from a standing position, and it is therefore a further object to provide such a weeder which may be operated at the lower end of a handle or pole, of sufficient length that the user may stand upright, but which will be held open automatically when pressed into the ground, which will close automatically upon the weed and its root, beneath the ground, by the action of removing the weed, and which will be provided with means convenient to the foot of the user for pressing the weeder into the ground, and for further use as a fulcrum to remove the weed and its root.

It is also an object to provide a weeder of the character indicated, which shall be simple in construction, and rugged, and which will be inexpensive to manufacture.

With these and other objects in mind, as will appear hereafter, my invention comprises the novel weeder as a whole, and the novel parts and combinations thereof, as shown in the accompanying drawing, and as will be described in this specification and more particularly pointed out by the claims which terminate the same.

In the accompanying drawing I have shown my invention embodied in a form which is at present preferred by me, it being understood that various changes may be made in the form, character and relative arrangement of the parts of the device within the principles of my invention as hereinafter made clear.

Figure 1 is a side elevation of my weeder, in position for piercing the ground about a weed, and Figure 2 is a front elevation of the same.

Figure 3 is an illustration somewhat similar to Figure 2, but showing the parts tilted and in the closed position, as they would be in the act of lifting out a weed root, the weed and its root, however, being omitted from the showing for clearer illustration.

Figure 4 is a bottom plan view of the weeder, with parts in the position of Figure 1.

Figure 5 is a section on line 5—5 of Figure 2, illustrating the weeder fingers in open position, and Figure 6 is a similar view showing the fingers in closed position.

While previous weeders of the same general type have comprised two fingers, movable toward and from each other, these fingers have necessarily been made sufficiently broad to engage properly and pull a weed root of considerable size, such as the roots of dandelions and false dandelions. In consequence, whenever they are pressed into the ground and the fingers close they necessarily enclose between them an appreciable amount of earth in addition to the weed root, and lift out a considerable area of grass surrounding the weed, thus marring the appearance of the lawn and leaving large holes in the lawn. In distinction to this type my weeder comprises not two broad fingers but three or more slender fingers, which cooperate as a group, not any two with each other, but all as a group, to surround a weed root, after they have been pressed into the earth, and then to close and converge upon the weed root so that these three or more fingers move relatively towards the weed root, but each one individually, thereby cutting through the dirt close about the weed root and through the grass, but not engaging and lifting more than the root which they grip between them at the end of their converging movement. In consequence, when the weed root is lifted, none of the earth or of the surrounding grass is lifted, and the only hole left is the hole which previously was occupied by the weed or the weed root. By the construction which I have adopted, and which will be explained in detail hereafter, the fingers are held by gravity-controlled means in a normal open position, ready for pressure into the earth in a pattern surrounding the weed root, and the act of pressing them in further holds them open, but on the contrary, when the weeder is tilted to lift out the weed root, by reason of a fulcrum which is incorporated in the weeder and operatively connected to the fingers, the fingers are caused to grip the weed root all the more firmly, so that there is little danger that the weeder will fail to pull out the root.

The device may be mounted at the lower end of a handle 5, which may be of any length desired, for instance of such length that the user may employ it while standing upright. From the lower end of this handle depends a finger 1, which preferably is fixed to and rigid with the handle. Pivotally mounted upon the handle, or upon the upper end of the fitting which includes the fixed finger 1, are at least two movable fingers, which may be alike, although oppositely disposed, one right and the other left-handed, and which for convenience of description are designated, respectively, 2 and 20. As is best seen in Figure 4, the fingers 2 and 20 are pivotally mounted at the lower end of the handle or at the upper end of the fixed finger 1, but upon lateral axes, which axes, however, are angularly disposed as viewed in plan (see Figure 4). Thus the finger 2 is pivoted upon the pin end 21, and the finger 20 upon the angularly disposed pin end 22. The pivotal movement of these fingers 2 and 20 may be further guided by flat surfaces formed upon them and bearing against correspondingly angled surfaces at the upper end of the finger 1, or at the lower end of the handle 5.

While I have described two movable fingers and one fixed finger, there may be more than two movable fingers, and indeed all the fingers may be movable, since the finger 1 may be similarly pivotally mounted and controlled in the same manner as the finger 2, and as will now be described.

To hold the fingers 2 and 20 spaced apart from the finger 1 in a normal open position they are provided with arms 3 and 30, which may be formed integral with the respective fingers, and which, extending laterally, act as weights to hold the fingers 2 and 20 spaced apart from the fixed finger 1. Preferably these two arms 3 and 30 lie alongside each other, and are interconnected by the lugs 31 and 32, respectively, as best seen in Figure 4. At their extreme ends they may be broadened, as indicated at 33, as fulcra to engage the ground, and for engagement by the foot.

In use the weeder is held substantially vertically, with the fingers gravity-held in open position, as seen in Figure 1, and they are then placed so that their pattern surrounds the stem or top of a weed and consequently its root, and then the fingers are pressed into the ground, either by pressure along the handle 5 or by pressure of the foot upon the arms 3 and 30, or by both such means. Such pressure, if the flattened ends 33 of the arms engage the ground, will not serve to close the fingers 2 and 20, but will instead hold them open, the weeder being somewhat rocked forwardly or away from the fulcrum 33 as the fingers pierce the ground. Now, the fingers having been pressed into the ground, the handle 5 is rocked rearwardly or toward the fulcrum 33, and this, by reason of the angularity of the pivot means 21 and 22, causes the fingers 2 and 20 to converge inwardly toward the finger 1, with the result that they close about the weed root, and grip it tightly beneath the surface of the ground. This closed position is shown in Figure 3. The fingers are slender, and their inwardly directed edges are preferably formed with sharp angles or edges, so that they will the more readily move or cut laterally through the ground and the grass, into close gripping engagement with the weed root. Continued rocking of the handle 5 causes the broadened ends 33 of the arms to act as a fulcrum, and to lift all the fingers with the engaged and surrounded weed root out of the ground. The fingers being at this time most closely in engagement with the weed root, and being moved substantially directly upwardly, they cause very little disturbance of the ground or of the grass about the weed, but do engage tightly and surround the weed root and cause it to be lifted. Indeed the fingers are preferably so formed that in the gripping position they are inclined somewhat inwardly and downwardly, and therefore pull the weed root out the more readily, and provide an open socket wherein the weed root and the weed top are the more readily received. No pull is exerted on the top, only upon the root beneath the surface. The action of the fingers in closing upon a weed root W is well illustrated in Figures 5 and 6, Figure 5 representing the open position as the fingers pierce the ground, the dotted line showing indicating the movement of the fingers 2 and 20 towards the finger 1, and Figure 6 illustrating the final closed position of the fingers, gripping and compressing the weed root.

What I claim as my invention is:

1. A weeder comprising at least three ground-piercing fingers normally spaced apart and grouped to surround a weed root, and means to move said fingers together, and guiding them during such movement to converge on such root.

2. A weeder comprising at least three ground-piercing fingers, means normally holding said fingers spaced apart and grouped to surround a weed root, and means to move said fingers together, and guiding them during such movement to converge on such root.

3. A weeder comprising at least three ground-piercing fingers, normally spaced apart and grouped to surround a weed root, means guiding said fingers for relative movement, to converge upon such root, and means including a laterally spaced ground-engaging fulcrum operatively connected to effect such convergence.

4. A weeder comprising at least three ground-piercing fingers, means guiding said fingers for relative movement from an open position, in which they surround a weed root, to converge into a closed position, closely surrounding such root, and gravity-controlled means to hold said fingers normally in the open position.

5. A weeder comprising at least three ground-piercing fingers, means guiding said fingers for relative movement from an open position, in which they surround a weed root, to converge into a closed position, closely surrounding such root, a laterally extending arm operatively connected to hold the fingers normally in the open position by gravity, and disposed at the ground level to serve as a fulcrum to effect convergence of the fingers and for the extraction of the engaged root.

6. A weeder comprising a support, at least three ground-piercing fingers depending from the support and grouped to surround a weed root, means guiding certain of said fingers for movement such as to effect convergence of all the fingers upon such a surrounded root, and means including a distant ground-engaging fulcrum for effecting such convergence.

7. A weeder comprising a handle, a finger depending from and rigid with the handle, a plurality of pivot means carried by said handle, the axes whereof extend laterally but relatively angularly in plan, a like number of fingers disposed alongside of the fixed finger and cooperating therewith in a pattern to surround a weed root, and pivotally mounted upon and guided by said pivot means for movement towards and from the fixed finger, from an open ground-piercing position, to a closed root-gripping position, and means to effect movement of the fingers between such positions.

8. A weeder comprising a handle, a finger depending from and rigid with the handle, at least two pivot means carried by said handle, the axes whereof extend laterally but relatively angularly in plan, a finger pivotally mounted on each such pivot means, to lie alongside the fixed finger, the group of fingers forming a pattern to surround a weed root, and the angularity of the pivot axes being such that the pivoted fingers may converge on the fixed finger to grip such root, and an arm rigid with and extending laterally from each pivoted finger, and all such arms lying alongside each other at the ground level, to effect such convergence when engaged as fulcra with the ground.

9. A weeder comprising a handle, a finger depending from and rigid with the handle, at least two pivot means carried by said handle, the axes whereof extend laterally but relatively angularly in plan, a finger pivotally mounted on each such pivot means, to lie alongside the fixed finger, the group of fingers forming a pattern to surround a weed root, and the angularity of the pivot axes being such that the pivoted fingers may converge on the fixed finger to grip such root, an arm rigid with and extending laterally from each pivoted finger, and all such arms lying alongside each other at the ground level, to effect such convergence when engaged as fulcra with the ground, and means to interengage said arms for joint and like movement thereof and of the corresponding fingers.

EDWARD L. RASMUSSEN.